(12) United States Patent
Riley et al.

(10) Patent No.: US 8,917,717 B2
(45) Date of Patent: Dec. 23, 2014

(54) METHOD AND SYSTEM FOR MULTI-MODAL COMMUNICATIONS

(75) Inventors: John Riley, Topsfield, MA (US); Daniel Thomas Smires, Freehold, NJ (US); Mary Grikas, Colts Neck, NJ (US)

(73) Assignee: Vonage Network LLC, Holmdel, NJ (US)

( * ) Notice: Subject to any disclaimer, the term of this patent is extended or adjusted under 35 U.S.C. 154(b) by 2259 days.

(21) Appl. No.: 11/705,502

(22) Filed: Feb. 13, 2007

(65) Prior Publication Data

US 2008/0192732 A1 Aug. 14, 2008

(51) Int. Cl.
*H04L 12/66* (2006.01)
*G06F 15/16* (2006.01)

(52) U.S. Cl.
CPC ................................. *H04L 12/66* (2013.01)
USPC ............................ 370/352; 709/203; 709/227

(58) Field of Classification Search
USPC .................................. 370/352; 709/203, 227
See application file for complete search history.

(56) References Cited

U.S. PATENT DOCUMENTS

| | | | |
|---|---|---|---|
| 4,100,377 A | 7/1978 | Flanagan | |
| 4,748,620 A | 5/1988 | Adelmann et al. | |
| 4,777,354 A | 10/1988 | Thomas | |
| 4,782,485 A | 11/1988 | Gollub | |
| 5,018,136 A | 5/1991 | Gollub | |
| 5,425,085 A | 6/1995 | Weinberger et al. | |
| 5,444,707 A | 8/1995 | Cerna et al. | |
| 5,452,289 A | 9/1995 | Sharma et al. | |
| 5,519,769 A | 5/1996 | Weinberger et al. | |
| 5,526,353 A | 6/1996 | Henley et al. | |
| 5,572,576 A | 11/1996 | Klausner et al. | |
| 5,623,490 A | 4/1997 | Richter et al. | |
| 5,638,433 A | 6/1997 | Bubien, Jr. et al. | |
| 5,835,126 A | 11/1998 | Lewis | |
| 5,966,427 A | 10/1999 | Shaffer et al. | |
| 5,995,491 A | 11/1999 | Richter et al. | |
| 6,014,437 A | 1/2000 | Acker et al. | |
| 6,067,516 A | 5/2000 | Levay et al. | |
| 6,084,956 A | 7/2000 | Turner et al. | |

(Continued)

FOREIGN PATENT DOCUMENTS

WO   WO 01/48984 A1   7/2001

OTHER PUBLICATIONS

Johnston, A., et al. "SIP Call Flow Examples" IETF Standard-Working-Draft, Internet Engineering Task Force (IETF), CH, vol. sip, No. 4 Apr. 2001, pp. 1-72, XP015027711, ISSN: 000-0004.

(Continued)

*Primary Examiner* — Melanie Jagannathan
*Assistant Examiner* — Stephanie Chang
(74) *Attorney, Agent, or Firm* — Duane Morris LLP; Joseph Pagnotta

(57) ABSTRACT

A system and method for provisionable, multi-modal communications, including detecting a provisioning condition, selecting a communications mode based on the provisioning condition from a first usage mode, a second usage mode, and a third usage mode, and displaying an interface corresponding to the selected communications mode. The first usage mode includes a first communications channel supporting a first communication data consisting of instant messages (IM) and in-network voice data. The second usage mode includes a second communications channel supporting a second communication data consisting of IM, in-network voice data and out-of-network voice data. The third usage mode includes a second communications channel supporting a third communication data comprising video data.

11 Claims, 8 Drawing Sheets

(56) References Cited

U.S. PATENT DOCUMENTS

| | | |
|---|---|---|
| 6,097,804 A | 8/2000 | Gilbert et al. |
| 6,104,706 A | 8/2000 | Richter et al. |
| 6,104,711 A | 8/2000 | Voit |
| 6,115,460 A | 9/2000 | Crowe et al. |
| 6,115,468 A | 9/2000 | De Nicolo |
| 6,118,860 A | 9/2000 | Hillson et al. |
| 6,122,364 A | 9/2000 | Petrunka et al. |
| 6,128,304 A | 10/2000 | Gardell et al. |
| 6,128,379 A | 10/2000 | Smyk |
| 6,137,869 A | 10/2000 | Voit et al. |
| 6,138,072 A | 10/2000 | Nagai |
| 6,167,042 A | 12/2000 | Garland et al. |
| 6,169,741 B1 | 1/2001 | LeMaire et al. |
| 6,175,565 B1 | 1/2001 | McKinnon et al. |
| 6,178,239 B1 | 1/2001 | Kishinsky et al. |
| 6,185,285 B1 | 2/2001 | Relyea et al. |
| 6,188,762 B1 | 2/2001 | Shooster |
| 6,195,425 B1 | 2/2001 | Farris |
| 6,226,286 B1 | 5/2001 | Danne et al. |
| 6,226,361 B1 | 5/2001 | Koyama |
| 6,243,443 B1 | 6/2001 | Low et al. |
| 6,249,576 B1 | 6/2001 | Sassin et al. |
| 6,266,405 B1 | 7/2001 | Madour et al. |
| 6,272,126 B1 | 8/2001 | Strauss et al. |
| 6,282,281 B1 | 8/2001 | Low |
| 6,282,284 B1 | 8/2001 | Dzonno et al. |
| 6,282,574 B1 | 8/2001 | Voit |
| 6,292,553 B1 | 9/2001 | Fellingham et al. |
| 6,298,062 B1 | 10/2001 | Gardell et al. |
| 6,298,064 B1 | 10/2001 | Christie |
| 6,304,572 B1 | 10/2001 | Christie |
| 6,304,637 B1 | 10/2001 | Mirashrafi et al. |
| 6,304,653 B1 | 10/2001 | O'Neil et al. |
| 6,310,941 B1 | 10/2001 | Crutcher et al. |
| 6,311,182 B1 | 10/2001 | Colbath et al. |
| 6,320,951 B1 | 11/2001 | Shtivelman et al. |
| 6,327,572 B1 | 12/2001 | Morton et al. |
| 6,330,317 B1 | 12/2001 | Garfinkel |
| 6,337,899 B1 | 1/2002 | Alcendor et al. |
| 6,343,115 B1 | 1/2002 | Foladare et al. |
| 6,349,132 B1 | 2/2002 | Wesemann et al. |
| 6,351,256 B1 | 2/2002 | Jones et al. |
| 6,351,464 B1 | 2/2002 | Galvin et al. |
| 6,359,880 B1 | 3/2002 | Curry et al. |
| 6,366,577 B1 | 4/2002 | Donovan |
| 6,366,661 B1 | 4/2002 | Devillier et al. |
| 6,373,836 B1 | 4/2002 | Deryugin et al. |
| 6,373,936 B1 | 4/2002 | Raniere et al. |
| 6,373,938 B1 | 4/2002 | Palacios et al. |
| 6,385,209 B1 | 5/2002 | Skirmont et al. |
| 6,389,119 B1 | 5/2002 | McBride |
| 6,393,115 B1 | 5/2002 | Krauss et al. |
| 6,393,476 B1 | 5/2002 | Barnhouse et al. |
| 6,400,820 B1 | 6/2002 | Edwards et al. |
| 6,404,746 B1 | 6/2002 | Cave et al. |
| 6,404,882 B2 | 6/2002 | Fellner et al. |
| 6,404,884 B1 | 6/2002 | Marwell et al. |
| 6,408,062 B1 | 6/2002 | Cave |
| 6,408,065 B1 | 6/2002 | O'Neil et al. |
| 6,411,697 B1 | 6/2002 | Creamer et al. |
| 6,411,704 B1 | 6/2002 | Pelletier et al. |
| 6,415,269 B1 | 7/2002 | Dinwoodie |
| 6,421,437 B1 | 7/2002 | Slutsman |
| 6,424,707 B1 | 7/2002 | Chatterjee |
| 6,430,175 B1 | 8/2002 | Echols et al. |
| 6,430,176 B1 | 8/2002 | Christie, IV |
| 6,430,275 B1 | 8/2002 | Voit et al. |
| 6,430,289 B1 | 8/2002 | Liffick |
| 6,434,143 B1 | 8/2002 | Donovan |
| 6,442,242 B1 | 8/2002 | McAllister et al. |
| 6,446,127 B1 | 9/2002 | Schuster et al. |
| 6,452,932 B1 | 9/2002 | Christie |
| 6,456,618 B2 | 9/2002 | Kozdon et al. |
| 6,463,052 B1 | 10/2002 | Christie |
| 6,466,570 B1 | 10/2002 | Low et al. |
| 6,470,010 B1 | 10/2002 | Szviatovszki et al. |
| 6,473,429 B1 | 10/2002 | Christie |
| 6,480,484 B2 | 11/2002 | Morton |
| 6,480,581 B1 | 11/2002 | Wu et al. |
| 6,487,200 B1 | 11/2002 | Fraser |
| 6,493,337 B1 | 12/2002 | Stevenson, III |
| 6,493,437 B1 | 12/2002 | Olshansky |
| 6,496,477 B1 | 12/2002 | Perkins et al. |
| 6,504,921 B2 | 1/2003 | Kotik et al. |
| 6,510,219 B1 | 1/2003 | Wellard et al. |
| 6,519,232 B1 | 2/2003 | Becher |
| 6,519,333 B1 | 2/2003 | Malik |
| 6,539,077 B1 | 3/2003 | Ranalli et al. |
| 6,542,589 B1 | 4/2003 | Baskin |
| 6,553,023 B1 | 4/2003 | Yamamiya et al. |
| 6,564,261 B1 | 5/2003 | Gudjonsson et al. |
| 6,567,398 B1 | 5/2003 | Aravamudan et al. |
| 6,567,419 B1 | 5/2003 | Yarlagadda |
| 6,571,212 B1 | 5/2003 | Dent |
| 6,577,712 B2 | 6/2003 | Larsson et al. |
| 6,584,094 B2 | 6/2003 | Maroulis et al. |
| 6,584,098 B1 | 6/2003 | Dutnall |
| 6,584,186 B1 | 6/2003 | Aravamudan et al. |
| 6,584,510 B2 | 6/2003 | Anttila |
| 6,587,836 B1 | 7/2003 | Becar et al. |
| 6,597,685 B2 | 7/2003 | Miloslavsky et al. |
| 6,614,786 B1 | 9/2003 | Byers |
| 6,614,899 B1 | 9/2003 | Sollee et al. |
| 6,621,899 B2 | 9/2003 | Dezonno et al. |
| 6,628,760 B2 | 9/2003 | Mirashrafi et al. |
| 6,633,561 B2 | 10/2003 | Christie |
| 6,650,890 B1 | 11/2003 | Irlam et al. |
| 6,665,294 B2 | 12/2003 | Christie |
| 6,665,389 B1 | 12/2003 | Haste, III |
| 6,665,392 B1 | 12/2003 | Wellner et al. |
| 6,668,055 B2 | 12/2003 | Marwell et al. |
| 6,681,252 B1 | 1/2004 | Schuster et al. |
| 6,690,780 B2 | 2/2004 | Kotik et al. |
| 6,694,007 B2 | 2/2004 | Lang et al. |
| 6,697,475 B1 | 2/2004 | McLampy et al. |
| 6,707,811 B2 | 3/2004 | Greenberg et al. |
| 6,707,906 B1 | 3/2004 | Ben-Chanoch |
| 6,711,160 B2 | 3/2004 | Chan et al. |
| 6,714,988 B1 | 3/2004 | Takemoto et al. |
| 6,718,031 B2 | 4/2004 | Fellner et al. |
| 6,724,755 B1 | 4/2004 | Kim |
| 6,731,630 B1 | 5/2004 | Schuster et al. |
| 6,731,642 B1 | 5/2004 | Borella et al. |
| 6,731,741 B1 | 5/2004 | Fourcand et al. |
| 6,741,586 B1 | 5/2004 | Schuster et al. |
| 6,748,057 B2 | 6/2004 | Ranalli et al. |
| 6,760,429 B1 | 7/2004 | Hung et al. |
| 6,763,226 B1 | 7/2004 | McZeal, Jr. |
| 6,765,931 B1 | 7/2004 | Rabenko et al. |
| 6,769,020 B2 | 7/2004 | Miyazaki et al. |
| 6,771,637 B1 | 8/2004 | Suzuki et al. |
| 6,775,368 B1 | 8/2004 | Lee et al. |
| 6,778,661 B1 | 8/2004 | Yumoto et al. |
| 6,798,873 B2 | 9/2004 | Vardi et al. |
| 6,819,752 B2 | 11/2004 | Raniere et al. |
| 6,822,945 B2 | 11/2004 | Petrovykh |
| 6,839,359 B2 | 1/2005 | Skirmont et al. |
| 6,839,421 B2 | 1/2005 | Esparza et al. |
| 2001/0005412 A1 | 6/2001 | Light et al. |
| 2001/0005415 A1 | 6/2001 | Grunsted et al. |
| 2001/0014919 A1 | 8/2001 | Tzirin |
| 2002/0007391 A1 | 1/2002 | Suzuki |
| 2002/0049815 A1 | 4/2002 | Dattatri |
| 2002/0049860 A1 | 4/2002 | Koistinen |
| 2002/0055879 A1 | 5/2002 | Wengrovitz et al. |
| 2002/0095516 A1 | 7/2002 | Nada |
| 2002/0112073 A1 | 8/2002 | McLampy et al. |
| 2002/0114430 A1 | 8/2002 | Murata |
| 2002/0126818 A1 | 9/2002 | Cai et al. |
| 2002/0129131 A1 | 9/2002 | Yamashita |
| 2002/0150083 A1 | 10/2002 | Fangman et al. |
| 2002/0191635 A1 | 12/2002 | Chow et al. |
| 2003/0005280 A1 | 1/2003 | Bobde et al. |
| 2003/0041132 A1 | 2/2003 | Lim et al. |

(56) References Cited

U.S. PATENT DOCUMENTS

| | | |
|---|---|---|
| 2003/0043787 A1 | 3/2003 | Emerson, III |
| 2003/0053446 A1 | 3/2003 | Kwon |
| 2003/0095541 A1 | 5/2003 | Chang et al. |
| 2003/0095542 A1 | 5/2003 | Chang et al. |
| 2003/0108064 A1 | 6/2003 | Bilke et al. |
| 2003/0162526 A1 | 8/2003 | Ogman et al. |
| 2003/0174695 A1 | 9/2003 | Lautenschlager et al. |
| 2003/0202504 A1 | 10/2003 | Dhara et al. |
| 2003/0219029 A1 | 11/2003 | Pickett |
| 2004/0028025 A1 | 2/2004 | Chang |
| 2004/0028207 A1 | 2/2004 | Kato |
| 2004/0039938 A1 | 2/2004 | Katz et al. |
| 2004/0057415 A1 | 3/2004 | Colson et al. |
| 2004/0114575 A1 | 6/2004 | Morita et al. |
| 2004/0190711 A1 | 9/2004 | Miyajima |
| 2004/0205209 A1 | 10/2004 | Wengrovitz et al. |
| 2004/0205777 A1 | 10/2004 | Zalenski et al. |
| 2004/0215770 A1 | 10/2004 | Maher, III et al. |
| 2004/0223606 A1 | 11/2004 | Enete et al. |
| 2004/0258021 A1 | 12/2004 | Kashimoto et al. |
| 2004/0258238 A1 | 12/2004 | Wong |
| 2004/0258239 A1 | 12/2004 | Gallant et al. |
| 2005/0018659 A1 | 1/2005 | Gallant et al. |
| 2005/0136897 A1 | 6/2005 | Praveenkumar et al. |
| 2005/0192893 A1* | 9/2005 | Keeling et al. .................. 705/39 |
| 2007/0239885 A1* | 10/2007 | Vadlakonda et al. ......... 709/232 |
| 2008/0086564 A1* | 4/2008 | Putman et al. ................ 709/227 |

OTHER PUBLICATIONS

Rosenberg, J., et al. "STUN—Simple Traversal of UDP Through Network Address Translators" IETF Standard-Working-Draft, Internet Engineering Task Force (IETF), CH, vol. midcom, No. 3, Oct. 14, 2002, XP015002624, ISSN: 0000-0004.

Mahy, R., et al. "STUN—aware NAT draft-simu-midcom-stun-aware-nat-00.txt" IETF Standard-Working-Draft, Internet Engineering Task Force (IETF), CH, Apr. 10, 2002, XP015005296, ISSN: 0000-0004.

Mahy, R., et al. "Pre-Midcom Requirements for Traversal of NATs for traffic not supported by STUN draft-mahy-midcom-premidcom-relay-reqs-00.txt" IETF Standard-Working-Draft, Internet Engineering Taskforce, IETF, CH, Feb. 2003, XP015004271, ISSN: 0000-0004.

Fineberg, V. "A Practical Architecture for Implementing End-to-End QoS in an IP Network".Communications Magazine, IEEE vol. 40, Issue 1, Jan. 2002 pp. 122-130.

Melvin, H. et al. "Time Synchronization for VoIP Quality of Service", Internet Computing, IEEE vol. 6, Issue 3, May-Jun. 2002 pp. 57-63.

Srisuresh et al., "Middlebox Communication Architecture and Framework," RFC 3303, Internet Engineering Task Force (Aug. 2002), available at http://www.ietf.org/rfc/rfc3303.bd (last accessed Aug. 27, 2007).

Rosenberg et al., "NAT Friendly SIP," Internet Engineering Task Force (Jul. 20, 2001), available at http://tools.ietf.org/html/draft-rosenberg-sip-entfw-02 (last accessed Aug. 27, 2007).

"SpeedTouch 780 (WL) User's Guide," p. 38, line 1-p. 51, line 25, (Jan. 2006), retrieved from http://www/speedtouchdsl.com, retrieved on Jun. 18, 2007.

Feng Liu et al., "An Approach to Integrating Sip in Converged Multimodal/Multimedia Communication Services," Telecommunication Systems: Modeling, Analysis, Design and Management, Kluwer Academic Publishers, vol. 28, No. 3-4, p. 387-405, p. 391, line 28-p. 395, line 8 (Mar. 1, 2005).

* cited by examiner

METHOD AND SYSTEM FOR MULTI-MODAL COMMUNICATIONS

The disclosure claims the filing-date benefit of Provisional Application No. 60/772,570, filed Feb. 13, 2006, the specification of which is incorporated herein in its entirety.

FIELD OF THE INVENTION

The present disclosure relates generally to systems and methods for multi-modal communications. In particular, the present disclosure relates to systems and methods for a multi-modal communications interface including a plurality of provisionable usage modes.

BACKGROUND

Voice-over-IP (VoIP) technologies have revolutionized the telecommunications industry by enhancing the ability of people to communicate with each other readily, effectively, and economically by leveraging modern digital methods and packet-based devices to improve existing telephone technology. However, VoIP services compete with other modes of digital communication, including conventional instant messaging (IM) and video conferencing technologies. These competing modes have several disadvantages. For instance, IM is generally limited to text, graphics and basic, pre-programmed sounds contained within a dedicated network or application that may not be available or accessible on another network or user device. Conventional conferencing technologies generally require specialized and complicated equipment and software, thereby creating an information and economic barrier to adoption by consumers.

Accordingly, there is a need in the industry for technological solutions enabling broader and more effective participation in the VoIP revolution. Further, there is an opportunity for convergence in communications technologies including IM, voice, and video communications.

SUMMARY

Various disclosed embodiments are generally directed to a system and method for selectively provisionable, multi-modal, multi-platform communications. Such communications are available as multiple levels of service with corresponding interfaces. One disclosed embodiment includes a selectively provisionable, multi-modal communications method including detecting a provisioning condition, selecting a communications mode based on the provisioning condition from a first usage mode, a second usage mode, and a third usage mode, and displaying an interface corresponding to the selected communications mode.

BRIEF DESCRIPTION OF THE DRAWINGS

Various aspects of the present disclosure will be or become apparent to one with skill in the art by reference to the following detailed description when considered in connection with the accompanying exemplary non-limiting embodiments, wherein.

DETAILED DESCRIPTION

Various disclosed embodiments advantageously provide systems and methods for broader acceptance and participation in VoIP services. Further, embodiments also advantageously provide systems and methods enabling functional convergence in communications technologies including IM, voice, and video. In the disclosed embodiments, a softphone in particular and method of multi-modal communications in general supports at least three distinct usage modes (e.g., instant messaging (IM), softphone calling, videophone calling) and enhanced security features to enable different levels of use or communications capabilities.

Figure 1:
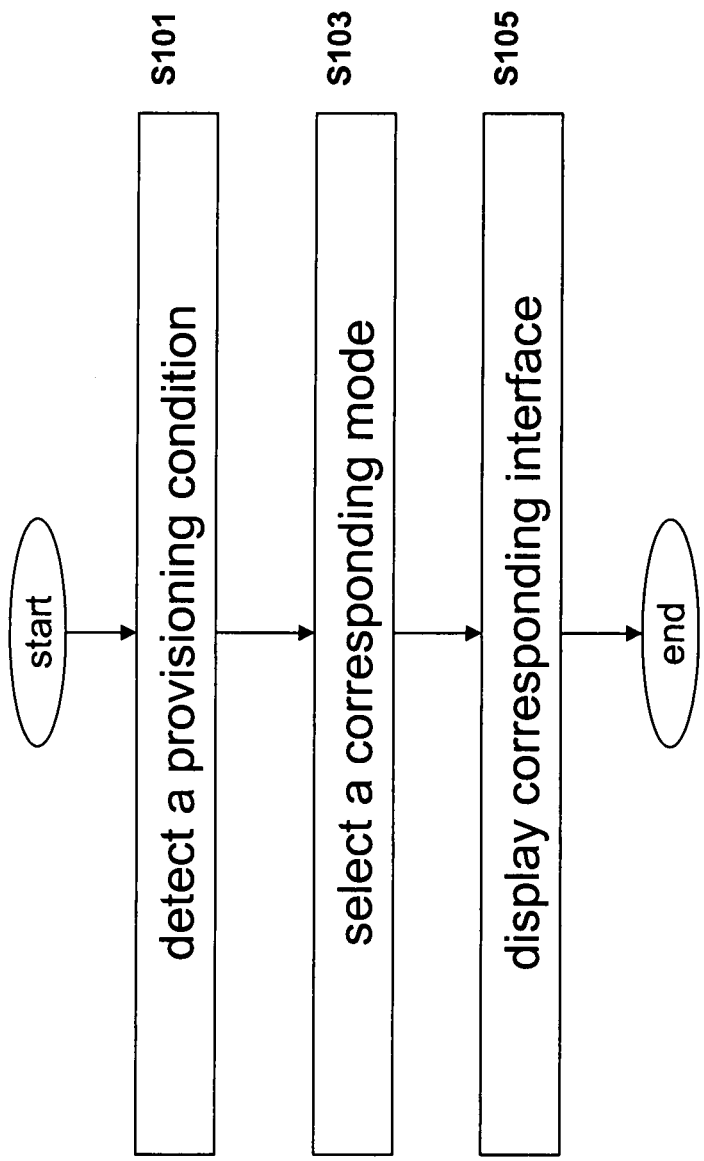
FIG. 1 illustrates a flow-chart outlining an exemplary disclosed method.

FIG. 1 illustrates a flow-chart outlining an exemplary disclosed method. In certain embodiments, the method includes a plurality of steps comprising detecting a provisioning condition S101, selecting a corresponding usage mode S103, and displaying an interface corresponding to the selected usage mode S105.

Detection of a provisioning condition (S101) is preferably performed at a local client on which the softphone is available. Suitable local clients include, but are not limited to, a general purpose computer, a special-purpose computer, a handheld computing device, a mobile phone, or other communications appliance known to those skilled in the art.

A provisioning condition includes, but is not limited to, an initialization condition, an upgrade condition, an update condition, and a reset condition. An initialization condition includes, but is not limited to, an initially provisioned service level based on an initial download or service subscription purchase. An upgrade condition includes, but is not limited to, a user's purchase of an upgrade to a higher usage level or mode. An update condition includes, but is not limited to, feature upgrades or updates corresponding to an automatic or periodic update of the softphone, typically for no or reduced charge. A reset condition corresponds to circumstances including, but not limited to, cancellation or termination of a user service subscription.

Selection of a corresponding usage mode based on the provisioning condition is also preferably performed at a local client. Selection of the corresponding usage mode includes, but is not limited to, enabling end-user access to particular communications functions, unlocking existing but previously restricted communications functions using an authentication mechanism, or retrieving additional or alternative functionality from a remote Service Provider network entity such as a server.

Displaying a corresponding interface is also preferably performed at a local client or another device in communication therewith. For instance, an interface is optionally displayed on an integrated display (including, but not limited to a CRT, plasma display, OLED display, or LCD), an attached display (including, but not limited to, an external display in communication with a communications appliance or controller), or a remote or networked display (including, but not limited to, a television or computer operably connected to a controller through a local area network).

Figure 2:
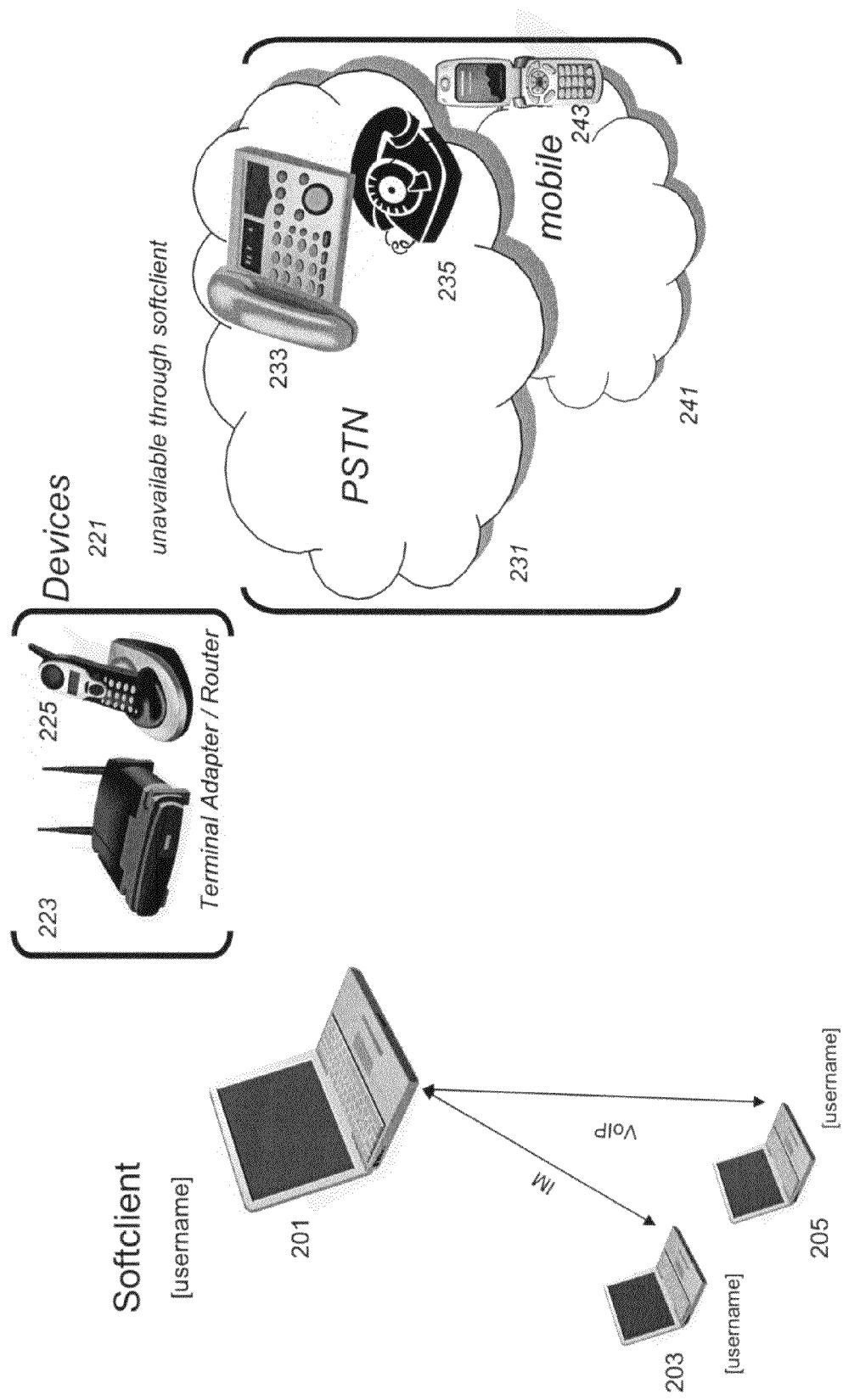
FIG. 2 is a schematic illustration of an exemplary first mode of a disclosed embodiment.
Figure 3:
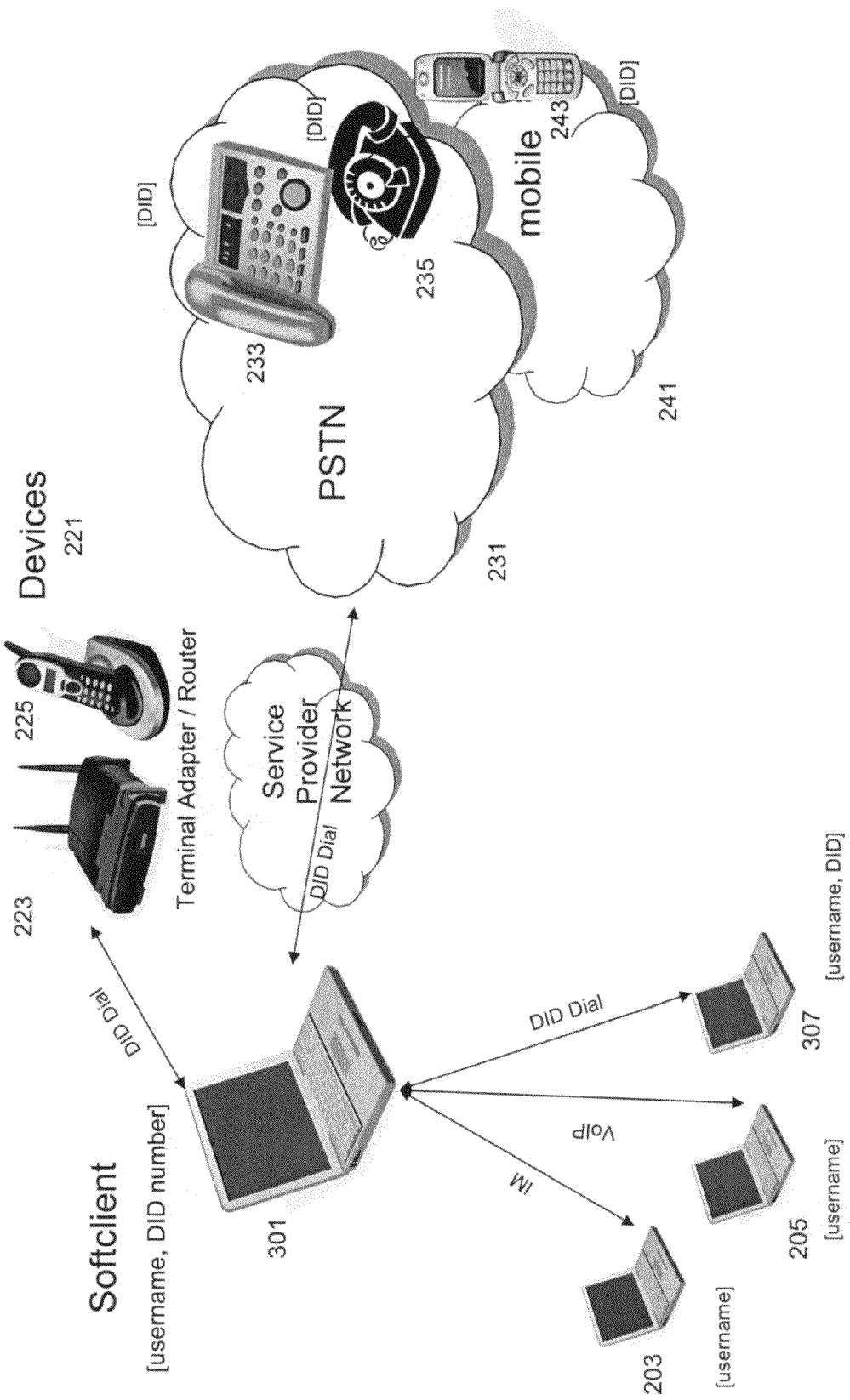
FIG. 3 is a schematic illustration of an exemplary second mode of a disclosed embodiment.
Figure 4:
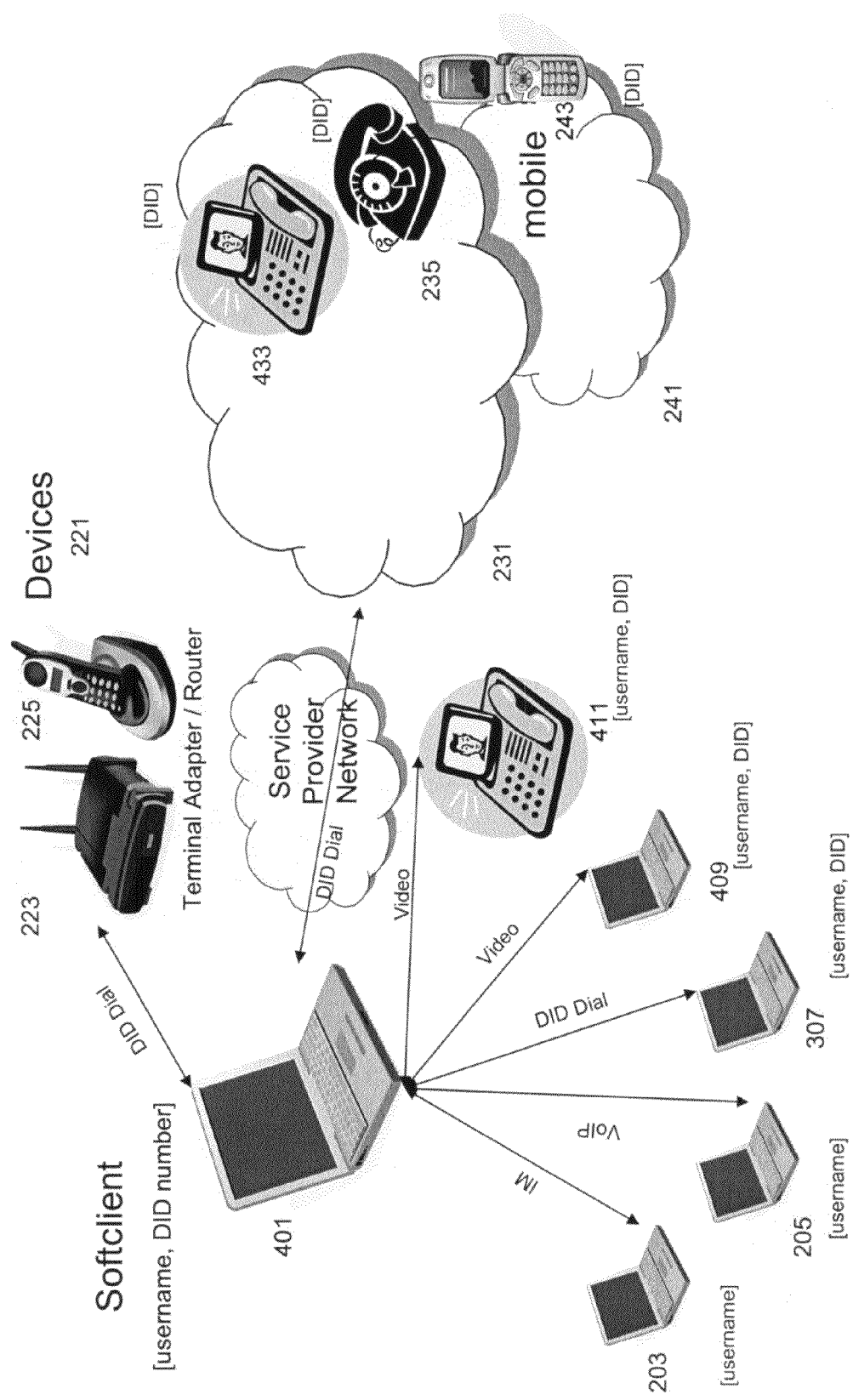
FIG. 4 is a schematic illustration of an exemplary third mode of a disclosed embodiment.

Various exemplary modes are illustrated in FIGS. 2-4. FIG. 2 illustrates an exemplary first mode, FIG. 3 illustrates an exemplary second mode, and FIG. 4 illustrates an exemplary third mode.

FIG. 2 is a schematic illustration of an exemplary first mode of a disclosed embodiment. In the first mode, embodiments of the softphone provide IM communications capability between a local client 201 and a remote client 203 as well as the ability to complete voice calls using VoIP with clients in the IM network domain 205. In this embodiment, devices 221 such as a terminal adapter/router 223 or telephone 225 (such as a "Plain-Old Telephone Service" (POTS)-type or a VoIP handset) are not used. Optionally, communications from the local client 201 are restricted to the IM, or in-network domain 205. For example, in the first usage mode, VoIP calls cannot be placed to the Public Switched Telephone Network (PSTN) 231 or mobile 241 networks including devices 233, 235, 243 capable of operating therein.

The IM network domain 205, and clients attached thereto, preferably supports an open protocol such as the Jabber/XMPP messaging protocols/formats. IM-related functions of the softphone are preferably available to all softphone users, regardless of mode (for example, the IM functions are preferably also available in the second and third modes described in greater detail below). Alternatively, users in the first mode can easily place voice calls to one another in a traditional softphone fashion (i.e., via operation of a keypad although a keypad-less operation is also considered). Users in this first mode are identified and communications are routed to users based on username.

As described above, in the first usage mode, calls are preferably prevented from reaching the PSTN 231, thereby imposing only a nominal, incremental cost to a VoIP Service Provider in increased voice traffic. In certain embodiments, the softphone is configured to facilitate a closed network. For example, the softphone may restrict the local user to add contact accounts only from the Service Provider Jabber chat network. Alternatively, other embodiments allow for integration with other messaging networks, allowing messages to and from other supported networks (for example, other Jabber networks). Additionally, a different billing rate (i.e., one-time or per use charge) may be applied to otherwise disallowed services in the first usage mode (i.e. voice or video calls outside of the closed network). Accordingly, the scope of network access for IM, voice, and video communications is provisionable.

With regard to the IM functions, certain embodiments of softphone preferably use the Service Provider's SIP infrastructure for establishing voice and video calls. This same network can be used to pass instant messages between subscribers and store "text-mail" for retrieval using the softphone. Accordingly, the IM functions are accomplished with minimal additional physical network infrastructure.

FIG. 3 is a schematic illustration of an exemplary second mode of a disclosed embodiment. The second mode preferably combines the IM capabilities such as those described above with VoIP service and additional calling features including, but not limited to, enhanced quality or enhanced performance voice codecs. In a preferred embodiment, the softphone (or the user of the softphone) is associated with a username and a Direct Inward Dialing (DID) phone number 301. In addition to receiving calls from the PSTN 231, the second mode further enables a user at a client 301 to dial other numbers outside of a restricted network including devices 233, 235, 243 on the PSTN 231 and mobile 241 networks. DID dialing is also optionally accomplished through devices 221 connected to the local client 301 including a VoIP terminal adapter 223 and handset 225. Further, DID dialing is also enabled to other softphone clients 307 identifiable by a DID number.

Selection of the second mode is optionally accomplished through a service upgrade purchased or otherwise obtained by a user. Optionally, initial provisioning may provision the second mode as the initial mode of use. In certain embodiments, the upgrade to or use of the second mode requires a subscription with the Service Provider. The service upgrade optionally includes advanced features including, but not limited to, voicemail, call-forwarding, simultaneous ringing and daisy-chain ringing.

The voice compression standard is optionally user-adjustable or provisionable/updatable by the Service Provider according to the various usage modes. A user-preferred codec may not be selectable in all cases based on a variety of factors including, but not limited to, paid service level, network congestion, and softphone mode.

Various embodiments accommodate different codecs for audio in the upstream and downstream directions. If different codecs are in use for the upstream and downstream directions, one, both, or neither are optionally displayed to the user. Preferably, the softphone application in the second mode supports at least one wideband codec. The softphone optionally supports G.722.2/AMR-WB, although this is not a required codec.

Preferably, the selection of the second mode is reflected in the user interface. For example, the softphone interface optionally changes to emphasize the ability to dial normal phone numbers and perform other call-handling features including, but not limited to, conferencing, call-waiting, and voicemail.

FIG. 4 is a schematic illustration of an exemplary third mode of a disclosed embodiment. The third mode preferably offers additional or enhanced features over either the first and second modes. In particular, the third mode enables softphone, IM, and video communications with a variety of devices including other softphone clients 203, 205, 307, 409, 411 and devices 433, 235, 243 on the PSTN 231 or mobile 241 networks. Alternatively, the softphone client 401 uses DID dialing through connected devices 221 such as a VoIP terminal adapter 223 and handset 225.

Similar to the process described above with regard to the second mode, selection of the third mode is optionally accomplished through a service upgrade purchased or otherwise obtained by a user. Further, the softphone may be initially provisioned to enable the third mode if, for instance, the softphone is distributed to a user who initially paid for a corresponding subscription or service level.

In the third mode, the softphone preferably supports SIP-based video communications capability. Videophone calling capability is preferably enabled or disabled via provisioning or upgrading as described previously. Embodiments including video preferably support calling scenarios similar to those offered by the Service Provider for voice calls including, but not limited to, call-forwarding, 3-way calling, call waiting, etc. These scenarios optionally function similarly with any combination of voice/video media.

Embodiments of the softphone in the third mode support various audio/video compression standards including, but not limited to, the H.264 video compression standard, CIF (352×

288 pixels) and QCIF (176×144 pixels) at up to 30 frames-per-second, H.263, MPEG 2, and Windows Media Player video compression standards.

In certain embodiments, the softphone provides flexible bandwidth for voice/video that is selectable from the user interface. If the bandwidth is changed, the frames-per-second rate maintained, for example, by reducing resolution or increasing audio/video compression.

To account for clock drift between the two videophone devices and also any network latencies, the softphone performs A/V synchronization. To preserve functionality on a variety of networks and sub-networks, the softphone is configured to send and receive both audio and video streams from behind a Network Address Translator (NAT) and over a public IP.

The softphone optionally allows for the recording of audio and video clips that can be easily attached to an email message or stored as files. The softphone optionally allows for the capture of single photos or frames from video. These captured images are made available for attachment to entries in the softphone phone/address book or stored as JPEG files. During an incoming call, the softphone optionally compares the incoming phone number or caller ID to entries in the phone/address book and display a corresponding entry's photo if available.

Optionally, the softphone includes a video configuration "wizard" to guide a user through the setup and initial use of the video interface camera. The wizard preferably runs when the softphone is first installed and is accessible from the softphone menus or user interface to the user for subsequent reference.

Preferably, the three softphone usage modes are contained within the same softphone application, each accessible with a different provisioning option. Accordingly, only a single softphone application needs to be distributed, regardless of the user's service or access level. In this case, the provisioning mode determines what licensing fees, if any, are due to the softphone provider.

A seamless software upgrade procedure is optionally provided as a background process (for instance, hidden from view of a typical user of the softphone) when a user upgrades from the first mode to the second or third usage mode. Preferably, the messaging (IM) and keypad or keypad-less dialing capabilities (including identifying users by their username) optionally remain through all usage modes or service tiers. Further, the Service Provider can seek reduced license costs or an unlimited distribution license to match the reduced functionality (and likely wider distribution) of the first mode softphone service.

Figure 5:
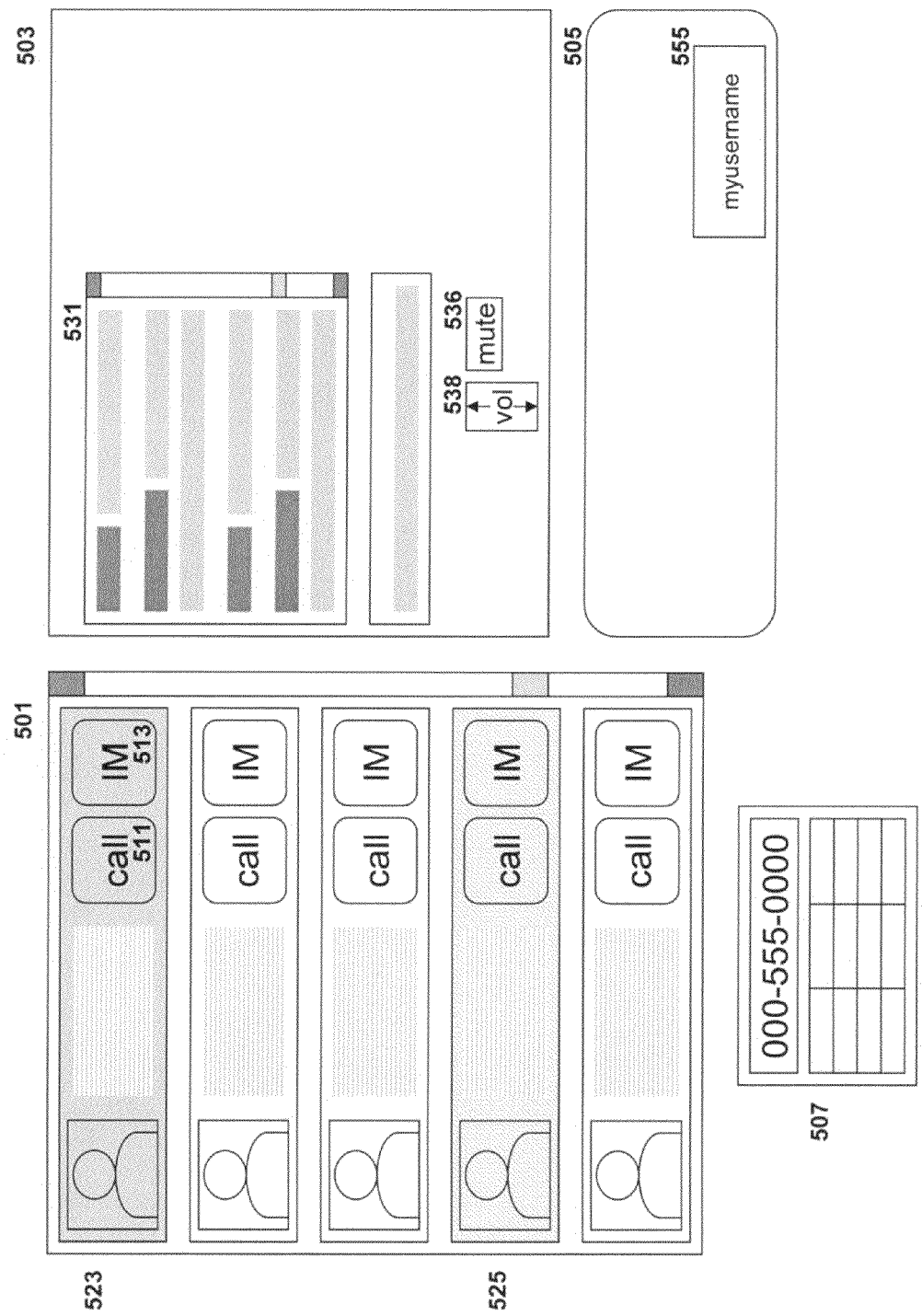
FIG. 5 is a schematic illustration of various exemplary softphone interface features corresponding to a first usage mode.
Figure 6:
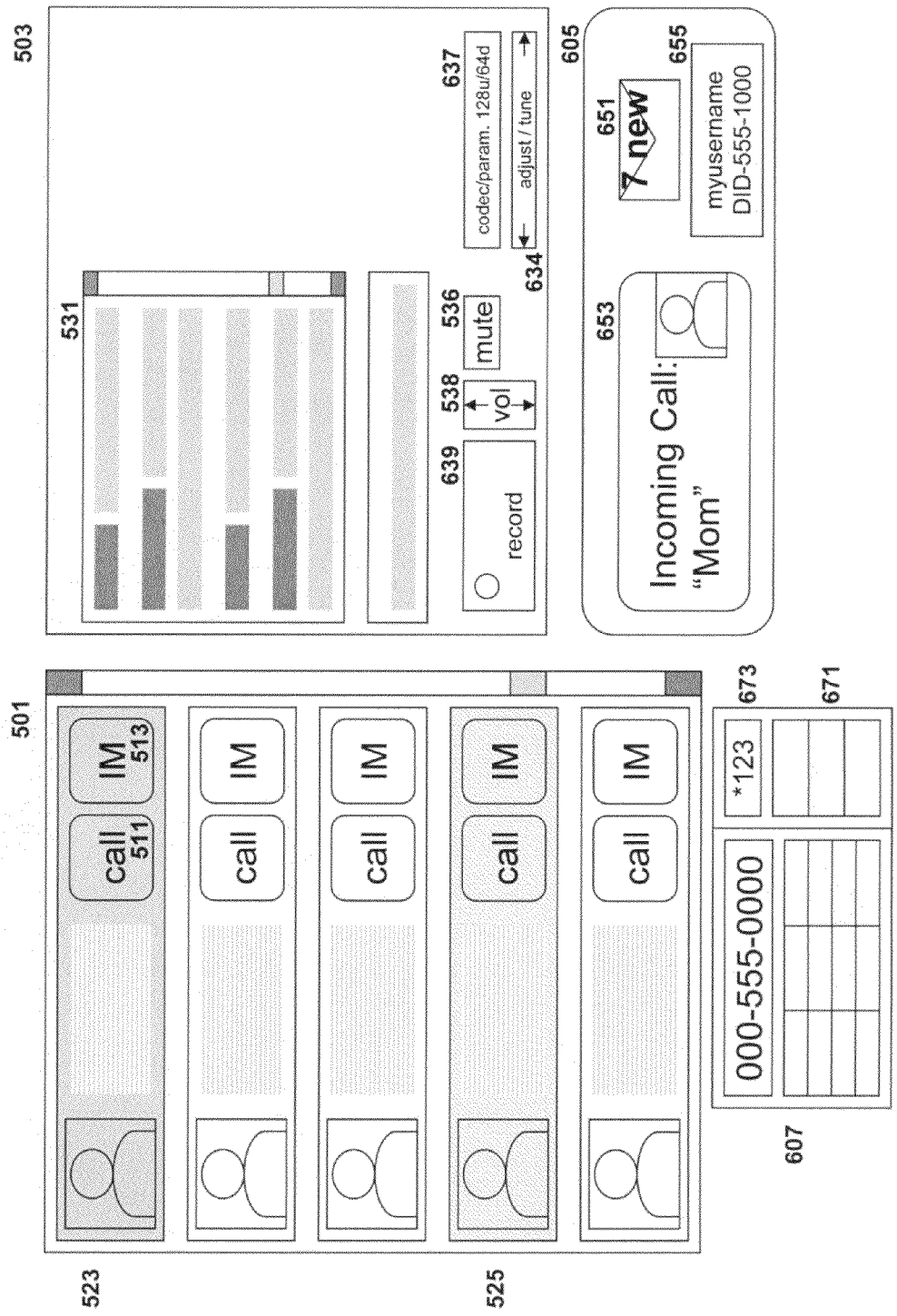
FIG. 6 is a schematic illustration of various exemplary softphone interface features corresponding to a second usage mode.
Figure 7:
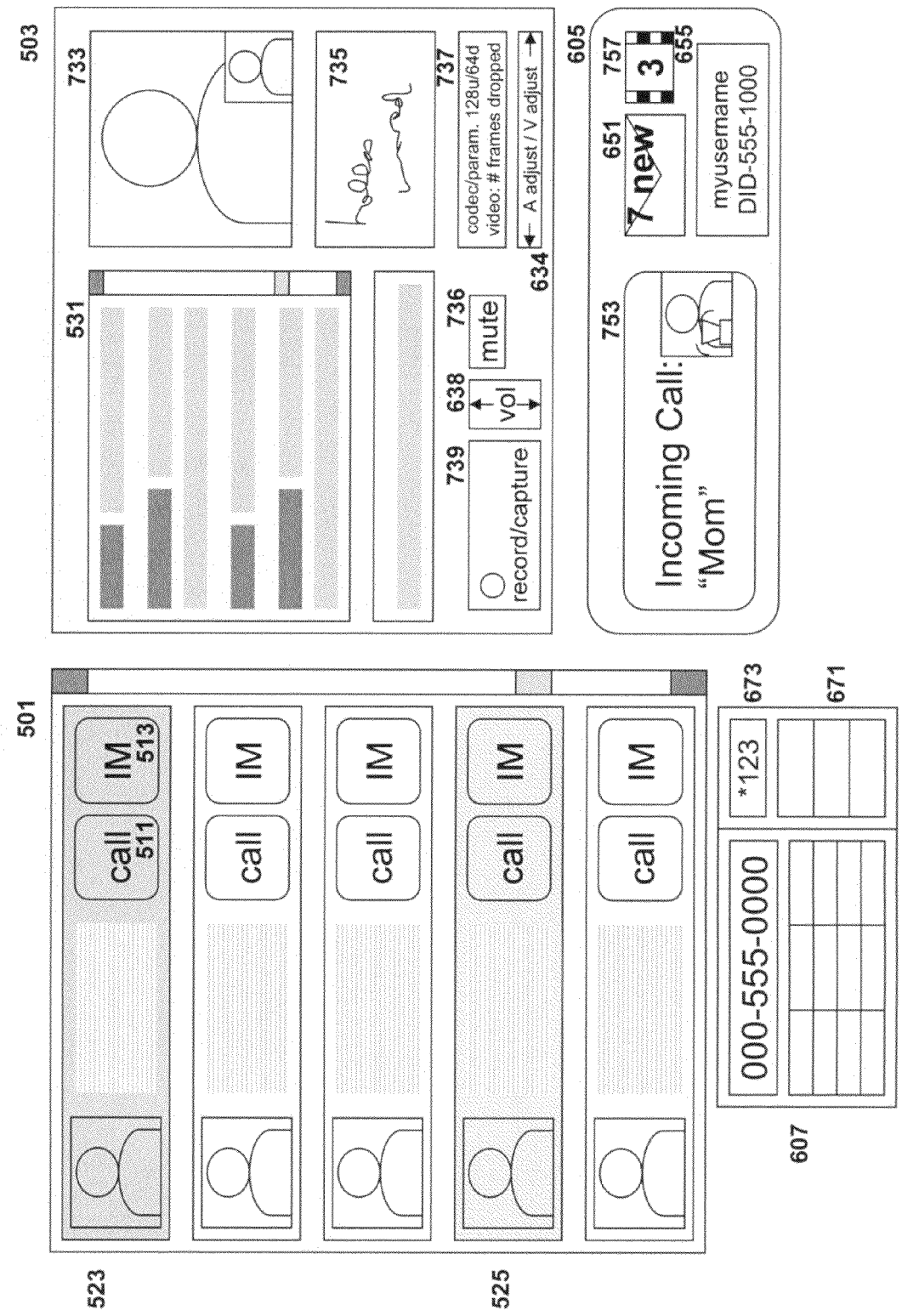
FIG. 7 is a schematic illustration of various exemplary softphone interface features corresponding to a third usage mode.

FIGS. 5-7 illustrate various exemplary interface features corresponding to the three usage modes discussed previously. FIG. 5 illustrates an exemplary interface corresponding to a first mode, FIG. 6 illustrates an exemplary interface corresponding to a second mode, and FIG. 7 illustrates an exemplary interface corresponding to a third mode.

Various embodiments provide a plurality of available user interfaces enabling user interaction with various softphone features. The user interfaces correspond to the various usage modes described above. Further, the user interfaces provide an intuitive conduit through which a softphone user conveniently interacts with the different suites of features enabled in the operation of various usage modes.

Changing modes according to a provisioning condition preferably changes the look and feel of the softphone interface to accommodate the changing suite of available features. However, the interfaces preferably maintain a familiar "phone-style" appearance across the usage modes. Video-enabled softphone accounts are optionally available at a premium to the voice-only softphone service.

Along with pull-down or pop-up menus for configuration or other tasks the softphone user interface preferably includes a "phone-style" graphical/clickable form for activating most of the calling functions. "Phone-style" forms correspond to traditional telephone buttons and physical features with which users are already generally familiar. Optionally, this interface style extends logically to include the videophone portions.

Various embodiments provide features reducing the intrusiveness of the softphone if running on a multi-purpose computer. For instance, the softphone can be minimized from the display, during which time it continues to be able to receive calls. When an incoming call is received, the softphone optionally pops up as the "top window," flashes, or provides another visual signal to alert the user even if the speaker/audio is disabled or unavailable.

Turning to FIG. 5, in the first mode, the interface displays an alphanumeric keypad 507 as an initial default setting. Additionally, it shows a contacts list 501 with presence information for each contact (for instance, a "buddy" list). Presence information is optionally denoted by an icon, animation, or shading 523. The contacts list 501 is separate from or integrated with (as illustrated in FIG. 5) the contacts/address book feature. Optionally, the user obtains an upgrade to the second mode (described in more detail below) including full VoIP calling capabilities such as calling entities on the PSTN 231 and including a DID number with which to receive calls.

Preferably, the softphone includes familiar features of IM services. For example, the softphone might allow the user to change presence information (for example, "Online", "Offline", "Unavailable", "Do Not Disturb", and customizable "Away-Messages"). Further, the softphone may include a contacts list 501 with the ability to add and delete contacts, as well as "whitelists" and "blacklists" for contacts and allowing/disallowing the reporting of presence information to other users.

Preferably, embodiments include a phone/address book with either keypad or keypad-less dialing capability. Various exemplary embodiments of keypad-less dialing are described in "System for Effecting a Telephone Call over a Computer Network Without Alphanumeric Keypad Operation," U.S. Patent Publication No. 2006-0210036, the entirety of which are incorporated herein by reference. Keypad or keypad-less dialing is preferably also available in the second and third modes, where a keypad is generally displayed to enable DID dialing to PSTN devices and other DID-enabled softphone users.

This address book optionally links or imports data from a personal information manager (for example, Microsoft Outlook, Google/Yahoo! Contacts and other E-mail address books). Further, embodiments preferably include a call history including, but not limited to, a log of calls placed, received, or missed. The size or window of this history log may be user configurable. The softphone optionally allows keypad-less dialing and "save to phone/address book" functions directly from the call history log.

For each incoming call, caller identification information is optionally displayed on the softphone. Caller identification information includes, but is not limited to, caller ID information from a CNAME database or customized caller identification information described in "Method and System for Customized Caller Identification", application Ser. No. 11/594,733, the entirety of which is incorporated herein by reference. The softphone optionally compares the detected incoming number of the call to numbers in the phone/address book and plays any additional information about the caller's identity that may be recorded locally or stored on the network, for instance, in the user's account.

Further, the contacts list 501 optionally displays the presence information for the contacts. Embodiments may include a scrolling chat history buffer 531 of user-defined length. In the chat history buffer 531, messages are optionally uniquely formatted according to predetermined or user-defined profiles (for example, by color, font, font size, or emphasis). The most currently received message in the history buffer may also have a format. The softphone may include support other familiar IM features including, but not limited to, creating/joining a private chatroom, sending private messages to other users (for example, using a direct-connection chat).

In certain embodiments, the interface allows a user to easily compose/send an instant message or initiate a call by selecting the recipient's ID or username from the softphone contacts list or address/phone book 501, call history log, or IM chat history buffer. Selection may be accomplished, for example, by clicking on an associated button 511, 513 or hyperlink. Basic voice controls such as volume 538 and muting 536 are preferably provided as is a user id window 555.

Turning to FIG. 6, in the second mode, the interface preferably displays contacts list or address/phone book 501 and the familiar numeric keypad 607. In the second mode, the softphone optionally displays a last-number redial function, programmable speed-dial buttons 671, a mute toggle button 536, a toggle button for recording phone conversations 639, speaker volume 538 and microphone level adjustments, or a programmable voicemail button 673. The programmable voicemail button 673 is optionally pre-programmed to dial a Service Provider voicemail number (for example, "*123") to retrieve voicemail. This button is optionally reprogrammable by the user or remotely by the Service Provider.

The codec in use during a call is optionally displayed in an information window 637. Certain embodiments include an interface feature 634 for easily selecting the preferred voice compression method. Optionally, a sequential "priority" list for automatic selection of preferred codec among a prioritized group is provided. To assist a user, codec names may include their corresponding bandwidth requirements when displayed.

In certain embodiments, the softphone displays the instantaneous bandwidth being used in the current call, expressed, for example, in kbps. The bandwidth in both the upstream and downstream directions is optionally displayed in the information window 637.

Further menu options are optionally made available for the user to fine-tune the voice processing. For example, the softphone optionally provides a menu option for enabling/disabling silence compression or defining the jitter buffer delay/depth. The softphone may further include acoustic echo cancellation for operation in speakerphone mode.

The softphone optionally displays incoming caller ID information or customized caller ID information in a caller ID window 653 and displays user ID information in window 655. The softphone further optionally enables or disables transmission of outgoing caller ID information. The interface further optionally displays a photo 653 corresponding to an entry 525 in the phone/address book 501 during an incoming call if the incoming phone number or caller ID entry corresponds to an entry in the phone/address book 501.

The softphone optionally includes a visual status indicator 651 to tell a user when a voicemail message is available. Visual status includes, but is not limited to, separate counts of new messages and unread messages. Preferably, indication is communicated to the softphone application from a Service Provider network using a SIP NOTIFY message. Optionally, the softphone also plays an audio alert indication (e.g., a stutter dial tone) if a message is available. Further, the softphone may include a timer display for the duration of the current or previous call.

Turning to FIG. 7, in the third mode, the interface preferably displays features relating to the video capability. For example, the softphone "phone-style" user interface may include a "video mute" toggle button 736 to enable/disable the camera operation during a call. The softphone "phone-style" user interface optionally includes a toggle button for recording phone and/or video conversations 739. Further, the softphone "phone-style" user interface preferably includes controls 734 for adjusting the audio or video quality parameters (for example, resolution and size) during a call. Adjusting these video parameters during a call preferably does not affect the intelligibility of the call.

The softphone application optionally displays the instantaneous bandwidth being used in the current video call, expressed in kbps. The bandwidth in both the upstream and downstream directions is optionally displayed in an information window 737. Embodiments of the softphone include a menu option for defining the jitter buffer delay/depth. This setting may apply to both the audio and video streams concurrently or allow for separate adjustment. Multi-party conference calling on the softphone in the third mode optionally includes a picture-in-picture or dual-video mode.

The softphone preferably includes a visual indicator when a video message is available 757. This indication is preferably communicated to the softphone from the Service Provider network using a SIP NOTIFY message.

Call waiting for a video conversation optionally permits an incoming caller's live video to be displayed in a preview window 753 before the user at the client 401 accepts the call. Alternatively, the preview window 753 displays a pre-recorded video clip associated with an address book entry 525 stored locally or provided by a network source (for instance, if this is a customized ID selected by the incoming caller). Such video previews are optionally disabled for privacy reasons. In the third mode, video capabilities are preferably supported, and these capabilities are reflected in the interface. In particular, video communications are enabled using a video screen 733 displaying incoming video. Optionally, the video screen 733 supports picture-in-picture to display the local video feed or another party. Further, the interface optionally includes a whiteboard space 735 through which communicating parties can work jointly to compose/edit documents or collaborate on other joint projects.

Figure 8:
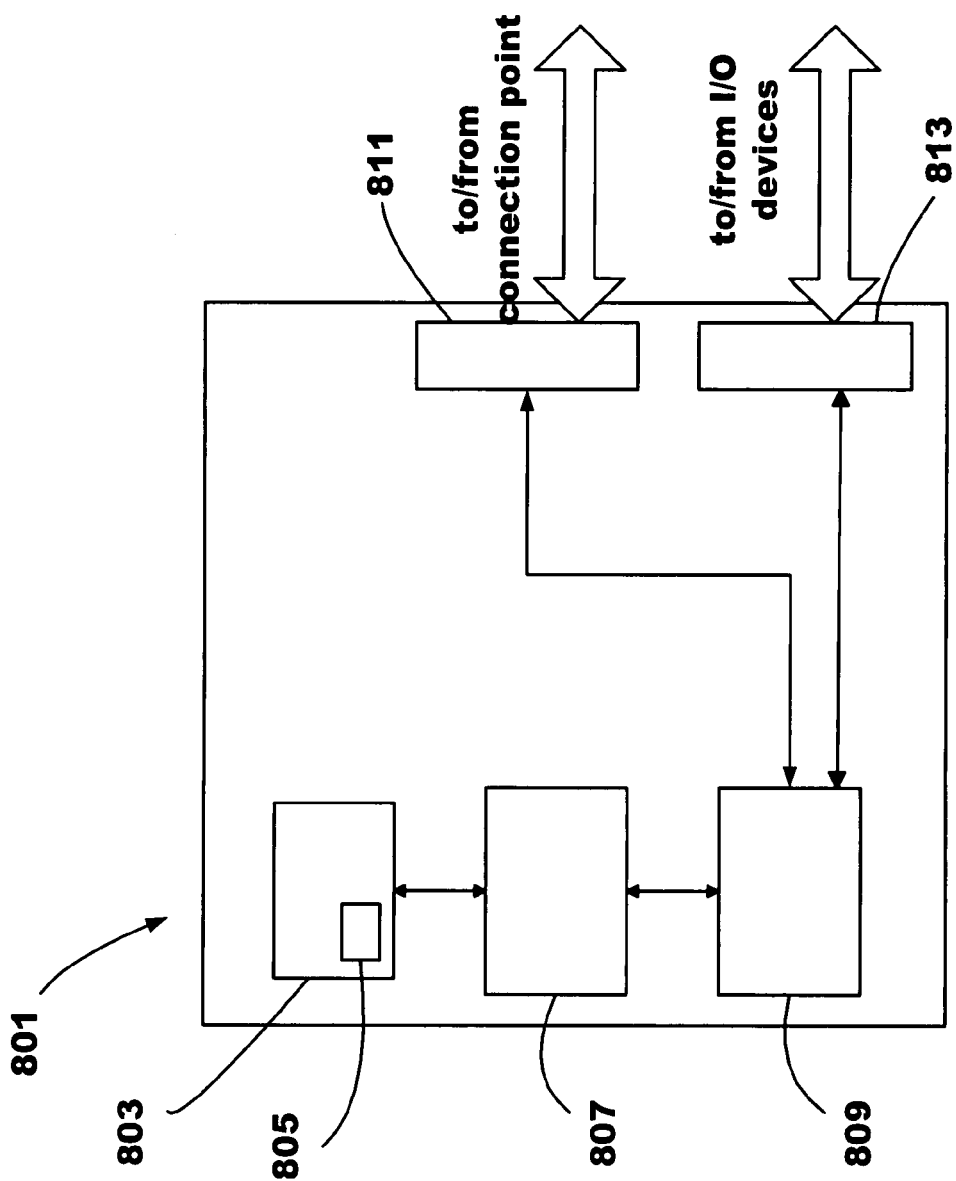
FIG. 8 is a schematic illustration of a controller configured to practice various disclosed embodiments.

With regard to the functionality and operation of various embodiments of the softphone, the softphone preferably includes a complete, full-featured, SIP-based VoIP-enabled application running on a host device. A suitable host device includes, but is not limited to, a multi-purpose computer, a handheld computing device, an internet appliance, and a mobile phone. An exemplary embodiment of a host device is illustrated in FIG. 8. Specifically, FIG. 8 depicts a schematic diagram of the controller 801 that may be used to practice the present invention. The controller 801 may be used to facilitate establishment of the softphone and its corresponding web-based interface and control of the system described above. The controller 801 may be one of any form of a general purpose computer processor used in accessing an IP-based network such as a corporate intranet, the Internet or the like. The controller 801 comprises a central processing unit (CPU) 807, a memory 803, and support circuits 809 for the CPU 807. The controller 801 also includes provisions 811/813 for connecting the controller 801 to the customer equipment 201, 301, 401 and service provider agent equipment 221 and the one or more input/output devices (not shown) for accessing the controller 801 and/or performing ancillary or administrative functions related thereto. Note that the provisions 811/813 are shown as separate bus structures in FIG. 8; however, they may alternately be a single bus structure without degrading or otherwise changing the intended operability of the controller 801 or invention in general. Additionally, the controller 801 and its operating components and programming as described in detail below are shown as a single entity; however, the controller may also be one or more controllers and programming modules interspersed around the system each carrying out a specific or dedicated portion of the diagnostic analysis as described earlier. By way of non-limiting example, a portion of the controller 801 or software operations may occur at a Service Provider server and another a portion of the controller 801 or software operations may occur at the service provider agent equipment 221. Other configurations of the controller and controller programming are known and understood by those skilled in the art.

The memory 803 is coupled to the CPU 807. The memory 803, or computer-readable medium, may be one or more of readily available memory such as random access memory (RAM), read only memory (ROM), floppy disk, hard disk, flash memory or any other form of digital storage, local or remote. The support circuits 809 are coupled to the CPU 807 for supporting the processor in a conventional manner. These circuits include cache, power supplies, clock circuits, input/output circuitry and subsystems, and the like. A software routine 805, when executed by the CPU 807, causes the controller 801 to perform processes of the present invention and is generally stored in the memory 803. The software routine 805 may also be stored and/or executed by a second CPU (not shown) that is remotely located from the hardware being controlled by the CPU 807.

The software routine 805 is executed when a preferred method of multi-modal communications as described is desired. The software routine 805, when executed by the CPU 807, transforms the general purpose computer into a specific purpose computer (controller) 801 that controls the web-based application, suite of diagnostic tools or other similar actions. Although the process of the present invention is discussed as being implemented as a software routine, some of the method steps that are disclosed therein may be performed in hardware as well as by the software controller. As such, the invention may be implemented in software as executed upon a computer system, in hardware as an application specific integrated circuit or other type of hardware implementation, or a combination of software and hardware. The software routine 805 of the present invention is capable of being executed on computer operating systems including but not limited to Microsoft Windows 98, Microsoft Windows 2000/XP/Vista, Apple OS X and Linux. Similarly, the software routine 805 of the present invention is capable of being performed using CPU architectures including but not limited to IBM Power PC, Intel x86, Sun service provider agentRC, AMD, Transmeta, and Intel ARM.

For user security and system stability, a limited number of instances (for example, one) of the softphone application runs on the host device. Multiple instances are supportable in embodiments including security features to prevent misuse of one user's identity by another. Alternative embodiments include a softphone running on a dedicated and access-controlled computing device.

To enhance security and monitor device/application status remotely, embodiments of the softphone authenticate with the Service Provider network at predetermined intervals including, but not limited to, each time the softphone is run, upon exiting the softphone, periodically, or in response to an authentication challenge from a service provider network entity (such as a proxy, gateway, authentication, or subscription server). Certain embodiments include a user- or remotely-accessible status console for diagnostics information related to the softphone or related hardware.

Selected embodiments include automatic queries to the Service Provider servers for client application updates (for example, newer versions of the software or security patches). Preferably, the softphone intermittently checks for updates or upgrades on a periodic or other basis (for example, an event-triggered basis such as application initiation or shutdown, or upon receipt of a SIP NOTIFY message triggering the softphone to perform an update/upgrade). If an update is available, the softphone preferably prompts the user to allow the softphone to automatically download and run the updated version (for example, in a manner similar to Microsoft's Windows Update service). However, softphone updates are optionally hosted by a softphone vendor. These updates or upgrades optionally impact the features and functionality of the various usage modes which are available to a softphone user.

For security and billing purposes, an authentication mechanism is provided to (1) authenticate a user and account to a particular softphone installation; and (2) limit the ability of distributing and reinstalling the Service Provider softphone. In various embodiments, the softphone optionally uses a one-time-use key or similar digital security features for restricting complete installations of the softphone. A complete installation includes installing the softphone and authenticating for the first time to the Service Provider network (and downloading any required provisioning information). The one-time-use key is provided by the Service Provider when the user signs-up for a softphone account. Optionally, the authentication mechanism is used to determine a provisioning condition parameter (for example, using information contained in any downloaded provisioning information) to enable or unlock at least one of the various usage modes corresponding to the appropriate usage mode obtained or paid for by the user.

The softphone optionally generates and keeps a hidden password for subsequent digest authentication challenges using SIP REGISTER messages. This hidden password is optionally generated from the one-time-use key. If the password is generated from the one-time-use key, the Service Provider's servers can then use the same mechanism. The hidden password is preferably not visible to an end user or other unauthorized personnel. The hidden password also preferably corresponds to only one user's account. Other authentication measures are also supported.

Certain embodiments include an auto-answer feature for use in diagnostic or other instances. If used for diagnostic purposes, this feature is initially configured to be disabled. The softphone preferably includes an optional automatic timeout feature that terminates a call after a period of inactivity of Real-time Transfer Protocol (RTP) packets. The automatic timeout feature minimizes unwanted billing of calls that may fail to terminate properly.

The softphone is available preferably downloaded from a network source. Alternatively, it is shipped or otherwise delivered to a user on a computer-readable medium including, but not limited to, a magnetic disk, magneto-optical disk, an optical disk, or flash memory.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed is:

1. A method for providing selectively provisionable, multi-modal communications, comprising:
  detecting a provisioning condition associated with a client device;
  selecting a communications mode from the group consisting of a first usage mode, a second usage mode, and a third usage mode based on the provisioning condition,
  wherein the first, second and third usage modes are each associated with respective communications functions resident on the client device irrespective of the provisioning condition;
  wherein the first usage mode provides communications only within a defined domain, the second usage mode provides communications within the defined domain as described in the first usage mode and further provides out-of-domain communications capability and the third usage mode provides communications within the defined domain, out of domain communications capability as described in the first and second usage modes and additionally provides video-enhanced communications capability; and
  displaying an interface corresponding to the selected communications mode.

2. The method of claim 1, wherein the first usage mode further comprises support for an instant message (IM) functionality and in-network voice calling functionality.

3. The method of claim 1, wherein the second usage mode further comprises support for out-of-network voice calling functionality to a PSTN network.

4. The method of claim 1, wherein the third usage mode further comprises support for video-enhanced communications capability with one or more in-network users, one or more out-of-network users on a PSTN network and one or more users on a mobile network.

5. The method of claim 4, wherein the video-enhanced communications capability is SIP-based.

6. The method of claim 1, wherein the step of detecting a provisioning condition includes
  receiving a digital key, and
  comparing the digital key to a stored code to output the provisioning condition.

7. The method of claim 6, wherein the stored code corresponds uniquely to a single username or DID number associated with a user of the multi-modal communications.

8. The method of claim 1, wherein the provisioning condition is selected from the group consisting of an initialization condition, an upgrade condition, an update condition, and a reset condition.

9. The method of claim 8 wherein the initialization condition further comprises an initially provisioned service level based on an initial download or service subscription purchase, the upgrade condition further comprises a user's purchase of an upgrade to a higher usage level or mode, the update condition further comprises feature upgrades or updates corresponding to an automatic or periodic update of the multi-modal communications and the reset condition corresponds to circumstances selected from the group consisting of cancellation and termination of a user service subscription.

10. The method of claim 1 wherein the step of selecting further comprises choices selected from the group consisting of enabling end-user access to particular communications functions, unlocking existing but previously restricted communications functions using an authentication mechanism and retrieving additional or alternative functionality from a remote Service Provider network entity.

11. A computer program product for use with a device on a communications network, comprising:
  a computer readable non-transitory medium having computer readable program code modules embodied in said medium for providing selectively provisionable, multi-modal communications;
  a computer readable first program code module for causing a computer to detect a provisioning condition associated with the device;
  a computer readable second program code module for causing a computer to select a communications mode from the group consisting of a first usage mode, a second usage mode, and a third usage mode based on the provisioning condition,
  a computer readable first usage mode communication function module;
  a computer readable second usage mode communication function module;
  a computer readable third usage mode communication function module;
wherein the first, second and third usage modes are each associated with the respective communications function module;
  wherein the first usage mode provides communications only within a defined domain, the second usage mode provides communications within the defined domain as described in the first usage mode and further provides out-of-domain communications capability and the third usage mode provides communications within the defined domain, out of domain communications capability as described in the first and second usage modes and additionally provides video-enhanced communications capability; and
a computer readable third program code module for causing a computer to display an interface corresponding to the selected communications mode.

* * * * *